(12) United States Patent
Su et al.

(10) Patent No.: US 11,557,271 B2
(45) Date of Patent: *Jan. 17, 2023

(54) DEGENERATIVE SOUND ISOLATION DEVICE

(71) Applicants: Toyota Motor Engineering & Manufacturing North America, Inc., Plano, TX (US); Toyota Jidosha Kabushiki Kaisha, Toyota (JP)

(72) Inventors: Xiaoshi Su, Ann Arbor, MI (US); Debasish Banerjee, Ann Arbor, MI (US); Yuji Shintaku, Toyota (JP); Katsuhiko Nakajima, Nisshin (JP)

(73) Assignees: Toyota Motor Engineering & Manufacturing North America, Inc., Piano, TX (US); Toyota Jidosha Kabushiki Kaisha, Toyota (JP)

( * ) Notice: Subject to any disclaimer, the term of this patent is extended or adjusted under 35 U.S.C. 154(b) by 587 days.

This patent is subject to a terminal disclaimer.

(21) Appl. No.: 16/680,089

(22) Filed: Nov. 11, 2019

(65) Prior Publication Data
US 2021/0142773 A1 May 13, 2021

(51) Int. Cl.
*G10K 11/162* (2006.01)
*B60R 13/08* (2006.01)

(52) U.S. Cl.
CPC ............ *G10K 11/162* (2013.01); *B60R 13/08* (2013.01)

(58) Field of Classification Search
CPC .............................. G10K 11/162; B60R 13/08
See application file for complete search history.

(56) References Cited

U.S. PATENT DOCUMENTS

| 8,381,872 | B2* | 2/2013 | Alexander | G10K 11/162 52/145 |
| 9,607,600 | B2* | 3/2017 | Swallowe | G10K 11/172 |
| 10,373,599 | B2* | 8/2019 | Hakuta | E04B 1/84 |
| 10,714,070 | B1* | 7/2020 | Su | G10K 11/175 |
| 11,204,204 | B2* | 12/2021 | Lee | F01N 1/023 |
| 2017/0263235 | A1* | 9/2017 | Elford | G10K 11/172 |
| 2019/0333491 | A1* | 10/2019 | Lee | G10K 11/172 |
| 2022/0148555 | A1* | 5/2022 | Su | G10K 11/162 |

FOREIGN PATENT DOCUMENTS

CN         106205590 A     12/2016

OTHER PUBLICATIONS

Long et al., "Multiband quasi-perfect low-frequency sound absorber based on double-channel Mie resonator," Applied Physics Letters, 112, 033507, 7 pages (2018).

(Continued)

*Primary Examiner* — Forrest M Phillips
(74) *Attorney, Agent, or Firm* — Christopher G. Darrow; Darrow Mustafa PC

(57) ABSTRACT

A sound isolation device includes at least one degenerate acoustic scatterer having a plurality of channels. The plurality of channels may include three or more channels. The channels have an open end and a terminal end, wherein the terminal ends of the channels are separate from one another. The at least one degenerate acoustic scatterer has an acoustic monopole response and an acoustic dipole response that have a substantially similar resonant frequency.

20 Claims, 7 Drawing Sheets

(56) References Cited

OTHER PUBLICATIONS

Lee et al., "Ultrasparse Acoustic Absorbers Enabling Fluid Flow and Visible-Light Controls," Physical Review Applied, 11, 024022, 14 pages (2019).
Elliott et al., "Omnidirectional acoustic absorber with a porous core and a metamaterial matching layer," Journal of Applied Physics 115, 204902, 15 pages (2014).
Liang & Li, "Extreme Acoustic Metamaterial by Coiling Up Space," Phys. Rev. Lett. 108, 114301, 5 pages (2012).
Cheng et al., "Ultra-sparse metasurface for high reflection of low-frequency sound based on artificial Mie resonances," Nature Materials, 14, 1013-1019 (2015).
Ghaffarivardavagh et al., "Ultra-open acoustic metamaterial silencer based on Fano-like interference," Phys. Rev. B 99, 024302, Abstract (2019).

* cited by examiner

DEGENERATIVE SOUND ISOLATION DEVICE

TECHNICAL FIELD

The present disclosure generally relates to sound isolation systems and devices and, more particularly, to sound isolation systems and devices that include a degenerate acoustic scatterer that has an acoustic monopole response and an acoustic dipole response.

BACKGROUND

The background description provided is to generally present the context of the disclosure. Work of the inventors, to the extent it may be described in this background section, and aspects of the description that may not otherwise qualify as prior art at the time of filing, are neither expressly nor impliedly admitted as prior art against the present technology.

In some automotive applications, low-frequency noise has been a long-standing issue for passenger comfort. Vehicles can generate significant low-frequency noises. These low-frequency noises may emanate from a variety of sources, such as the powertrain and tires of the vehicle, wind noise, and the like.

There are several different solutions for managing low-frequency noises, but many have drawbacks. For example, one solution requires the use of high reflection material. Structures made of high reflection material, such as doors and windows, can reflect noises away from the cabin of the vehicle. However, the reflected noises may cause noise pollution, and the performance of these types of systems is limited by the mass law.

Another solution requires the use of high absorption material. However, conventional porous sound-absorbing materials are only efficient for high frequency (greater than 1 kHz) noise reduction due to its high impedance nature. The sound transmission through porous materials is high if the material microstructure has a large porosity.

SUMMARY

This section generally summarizes the disclosure and is not a comprehensive disclosure of its full scope or all its features.

Examples of sound isolation devices and sound isolation systems are described herein. In one example, a sound isolation device includes at least one degenerate acoustic scatterer having a plurality of channels. The plurality of channels may include three or more channels. The channels have an open end and a terminal end, wherein the terminal ends of the channels are separate from one another. The at least one degenerate acoustic scatterer has an acoustic monopole response and an acoustic dipole response that have a substantially similar resonant frequencies.

A sound isolation system may include at least one degenerate acoustic scatterer located between generally opposing walls. The at least one degenerate acoustic scatterer having a plurality of channels. The plurality of channels may include three or more channels. The channels have an open end and a terminal end, wherein the terminal ends of the channels are separate from one another. The at least one degenerate acoustic scatterer has an acoustic monopole response and an acoustic dipole response that have a substantially similar resonant frequency.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The present teachings will become more fully understood from the detailed description and the accompanying drawings, wherein.

The figures set forth herein are intended to exemplify the general characteristics of the methods, algorithms, and devices among those of the present technology, for the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

The present teachings provide sound-absorbing structures having high acoustic absorbance despite being thin. The sound-absorbing structures of the present teachings and in contrast to competing structures can provide high absorbance across a broad frequency range by combing multiple designs for different frequencies.

A sound isolation device includes a degenerate acoustic scatterer that has an acoustic monopole response and an acoustic dipole response. The acoustic dipole response and the acoustic monopole response of the degenerate acoustic scatterer may have substantially similar resonant frequencies. The degenerate acoustic scatterer may include three more channels that have an open end and a terminal end. The device may include a plurality of degenerate acoustic scatters forming an array of equally spaced apart acoustic scatterers. By so doing, the array of degenerate acoustic scatterers can fully absorb sound waves at certain frequencies and hence provide extraordinary sound isolation performance.

With regards to the physics of the devices and system described in this specification, for acoustically small objects, the background and scattered waves can be decomposed into monopole and dipole components. Materials displaying a monopole response can only absorb the monopole component of the incident wave. The same limitation applies to dipole as well. The degenerate acoustic scatterers described in this specification have a monopole and dipole scattering at a similar frequency. This is possible when the monopole and dipole modes degenerate. The benefit of have both monopole and dipole responses are that these two components of the incident wave will participate the momentum exchange process and hence become available for absorption.

More simply, the scattering strength of the monopole and dipole are the same so that their magnitudes are the same. The monopole and dipole scattering have constructive interference in the forward scattering direction and cancels the background wave so that the transmission is zero; then, of course, the monopole and dipole scattering have destructive interference in the backward scattering direction.

Figure 1:
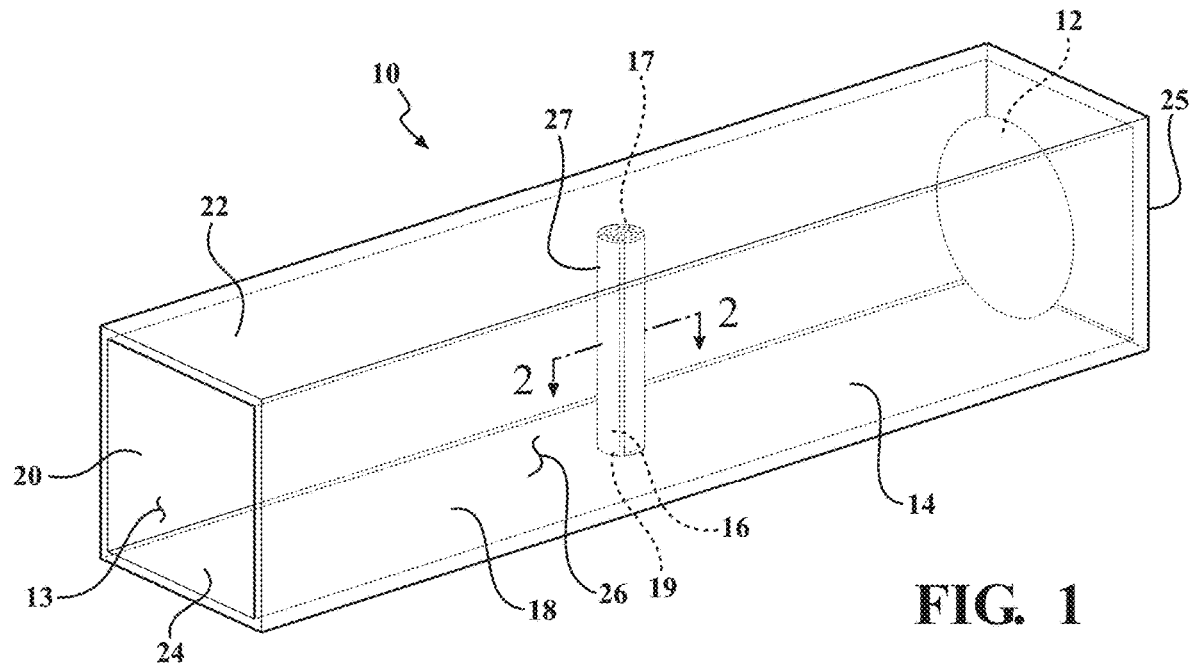
FIG. 1 illustrates a system for isolating sound utilizing a degenerate acoustic scatterer.

Referring to FIG. 1, one example of a sound isolation device 10 is shown. As its primary components, the sound isolation device 10 may include an acoustical source 12, a structure 14, and a degenerate acoustic scatterer 16. Regarding the acoustical source 12, the acoustical source 12 in this example is shown to be a speaker capable of producing sounds at a variety of wavelengths. However, it should be understood that the device 10 may be utilized in situations wherein sound is produced by the movement of one or more components. For example, the operation of components of an automobile, such as the rotating of the tires, wind noise, powertrain-related noises, and the like. As such, the source of the sound is not necessarily a speaker 12.

The structure 14, in this example, is shown to include a plurality of walls 18, 20, 22, and 24. The walls 18 and 20 generally oppose one another, while the walls 22 and 24 generally oppose one another. The walls 18, 20, 22, and 24 define a space 26 within the structure 14 and an opening 13, located opposite of the acoustical source 12. The structure 14 can be utilized in any one of several different applications. For example, the structure 14 could be mounted within a vehicle or forms a structural member or an additional part of the vehicle.

Within the space 26 defined by the walls 18, 20, 22, and 24 of the structure 14 is the degenerate acoustic scatterer 16. The degenerate acoustic scatterer 16 may have an acoustic monopole response and an acoustic dipole response. An acoustic monopole radiates sound waves towards all direction. The radiation pattern of monopole generally has no angle dependence for both magnitude and phase of the sound pressure. The radiation of acoustic dipole has an angle dependence $e^{i\theta}$, where $\theta$ is the polar angle in 2D. The pressure fields have the same magnitude and the opposite phase at the same distance along the two opposite radiation directions. The monopole response is equivalent to the sound radiated from a pulsating cylinder whose radius expands and contracts sinusoidally. The dipole response is equivalent to the sound radiated from two pulsating cylinders separated from each other with a small distance, the two pulsating cylinders radiate sound with the same strength but opposite phase.

The acoustic dipole response and the acoustic monopole response of the degenerate acoustic scatterer 16 may have substantially similar resonant frequencies. The term "substantially similar" regarding resonant frequencies should be understood to mean that the resonant frequencies may differ by approximately 10% or less. The degenerate acoustic scatterer 16 generally has a housing 27 that defines the overall shape of the degenerate acoustic scatterer 16. Generally, the housing 27 may be symmetrical across the width of the housing 27. However, the housing 27 may take anyone of a number of different shapes. There may be end caps 17 and 19 located at opposite ends of the housing 27.

Figure 2A:
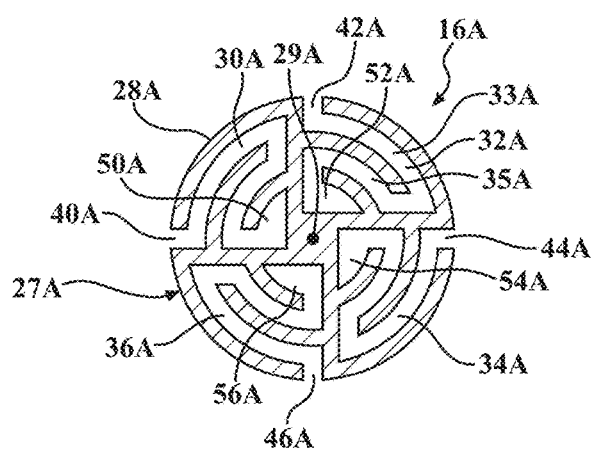
FIGS. 2A and 2B illustrate different examples of the degenerate acoustic scatterer.
Figure 2B:
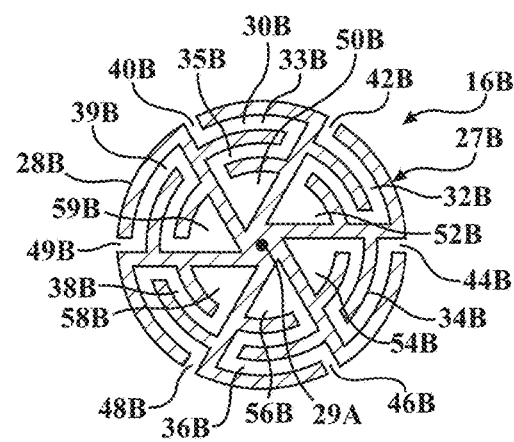

Referring to FIG. 2A-2B, a cross-section, generally along lines 2-2 of FIG. 1, of different examples of acoustic scatterers 16A and 16B are shown. It should be understood that the different designs of the degenerate acoustic scatterers 16A and 16B shown in FIGS. 2A and 2B are merely examples. The degenerate acoustic scatterer 16 could take any one of a number of different designs, not just those shown and described in this disclosure. Each of the degenerate acoustic scatterers 16A and 16B may have housings 27A and 27B that are generally symmetrical in shape across the width of the housings 27A and 27B. Each housing 27A and 27B generally define a perimeter 28A-28D. The generally symmetrical in shape across the width of the housings 27A and 27B may be substantially circular in shape as shown. However, should be understood that any one of a number of different shapes could be utilized.

The degenerate acoustic scatterers 16A and 16B may have a plurality of channels. For example, the degenerate acoustic scatterer 16A has four channels 30A, 32A, 34A, and 36A. As such, the degenerate acoustic scatterer 16A of FIG. 2A is a four-channel degenerate acoustic scatterer. The degenerate acoustic scatterer 16B of FIG. 2B has six channels 30B, 32B, 34B, 36B, 38B, and 39B. As such, the degenerate acoustic scatterer 16B of FIG. 2B is a six-channel degenerate acoustic scatterer. It should be understood that any one of a number of channels may be utilized in the degenerate acoustic scatterers 16A and/or 16B. However, as will be explained later, three or more channels allow for the degenerate acoustic scatterers 16A, and/or 16B to be equally effective regardless of the rotational positioning of the degenerate acoustic scatterer 16A and/or 16B.

The degenerate acoustic scatterer 16A, as stated previously, is a four-channel degenerate acoustic scatterer and therefore has four channels 30A, 32A, 34A, and 36A. Each of the four channels 30A, 32A, 34A, and 36A have an open and 40A, 42A, 44A, and 46A, respectively, located adjacent to the outer perimeter 28A. In addition, each of the four channels 30A, 32A, 34A, and 36A have terminal ends 50A, 52A, 54A, and 56A, respectively. The terminal ends 50A, 42A, 54A, and 56A may be located near a center 29A of the degenerate acoustic scatterer 16A. The terminal ends 50A, 52A, 54A, and 56A may be separate from each other and may not be in fluid communication with each other.

The volumes of the channels 30A, 32A, 34A, and 36A may be substantially equal to each other. In this example, "substantially equal" means that the volumes may be within 10% of each other. Additionally, the overall shape of the channels 30A, 32A, 34A, and 36A across the width of the degenerate acoustic scatterer 16A may be substantially similar in shape and/or design.

With regards to the design of the channels 30A, 32A, 34A, and 36A, the channels may have a general zigzag type form. For example, with regard to the channel 32A, the channel may have a zigzag, wherein one portion 33A of the channel 32A runs partially or substantially parallel to another portion 35A of the channel 32A. However, it should be understood that the design of the channel may vary greatly and may not necessarily be a zigzag type design. Additionally, this exact type design may be such that one portion of the channel does not run substantially parallel to another portion of the channel, as shown in the example of FIG. 2A.

Turning our attention to the degenerate acoustic scatterer 16B, as stated previously, the degenerate acoustic scatterer 16B is a six-channel degenerate acoustic scatterer and therefore includes channels 30B, 32B, 34B, 36B, 38B, and 39B. Each of the six channels 30B, 32B, 34B, 36B, 38B, and 39B have an open and 40B, 42B, 44B, 46B, 48B, and 49B, respectively, located adjacent to the outer perimeter 28B. In addition, each of the six channels 30B, 32B, 34B, 36B, 38B, and 39B have terminal ends 50B, 52B, 54B, 56B, 58B, and 59B, respectively. The terminal ends 50B, 52B, 54B, 56B, 58B, and 59B may be located near a center 29B of the degenerate acoustic scatterer 16B. The terminal ends 50B, 52B, 54B, 56B, 58B, and 59B may be separate from each other and may not be in fluid communication with each other.

The volumes of the channels 30B, 32B, 34B, 36B, 38B, and 39B may be substantially equal to each other. In this example, "substantially equal" means that the volumes may be within 10% of each other. Additionally, the overall shape of the channels 30B, 32B, 34B, 36B, 38B, and 39B across the width of the degenerate acoustic scatterer 16B may be substantially similar in shape and/or design.

With regards to the design of the channels 30B, 32B, 34B, 36B, 38B, and 39B, the channels may have a general zigzag type form. For example, with regard to the channel 30B, the channel may have a zigzag, wherein one portion 33B of the channel 30B runs partially or substantially parallel to another portion 35B of the channel 30B. However, it should be understood that the design of the channel may vary greatly and may not necessarily be a zigzag type design. Additionally, this exact type design may be such that one portion of the channel does not run substantially parallel to another portion of the channel, as shown in the example of FIG. 2B.

The degenerate acoustic scatterers 16A and/or 16B may be made using any one of several different materials. For example, the degenerate acoustic scatterers 16A and/or 16B may be made from an acoustically hard material, such as plastic, silicon, glass, and/or metals. As to metals, any metal may be utilized, such as aluminum, steel, titanium, etc.

Figure 3:
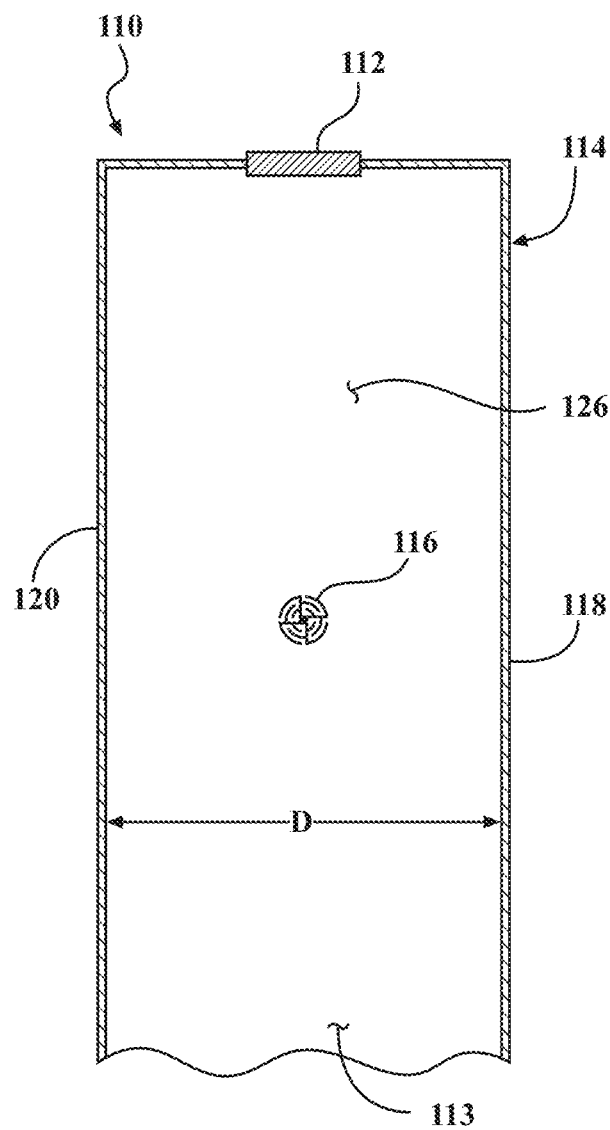
FIG. 3 illustrates one implementation of the degenerate acoustic scatterer.

Referring to FIG. 3, one of the sound isolating device 110 is shown. Here, like reference numerals have been utilized to refer to like elements, with the exception that the reference numerals have been incremented by 100. Additionally, it is noted that the degenerate acoustic scatterer 116 is the shape of the degenerate acoustic scatterer 16A illustrated in FIG. 2A. However, it should be understood that any of the different types of acoustic scatterers described in this description or otherwise conceivable could be utilized.

The device 110 includes a degenerate acoustic scatterer 116. The device 110 also includes walls 118 and 120 that are separated from each other by the distance D. The walls 118 and 120 generally oppose one another and define a space 126 therebetween. The device 110 also includes a sound source 112, which could be a speaker or any other source of sound, such as sounds produced by a nearby component, such as a vehicle powertrain, noise from wind coming in to contact with the vehicle, and/or tire noise emanating from the tires of the vehicle. At the opposite end of the sound source 112 is an opening 113. The degenerate acoustic scatterer 116 may be located near a midway point between the walls 118 and 120. This midway point is essentially half the distance D between the walls 118 and 120.

The distance D between the first wall 118 and the second wall 120 can vary based on the type of wavelength that one wishes to reduce. The distance D should be smaller than the wavelength at the resonant frequency:

$$D < \frac{c}{f},$$

wherein D is the distance of the space between the first wall 118 and the second wall 120, c is a speed of sound, and f is the resonant frequency of the monopole response and the dipole response of the degenerate acoustic scatterer 116.

Figure 4A:
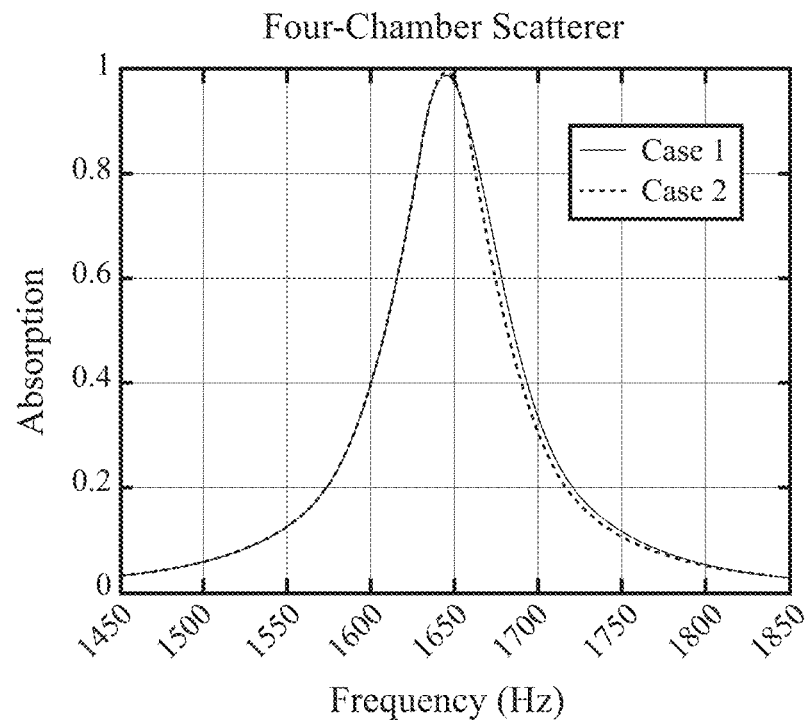
FIGS. 4A and 4B illustrate a sound-absorbing coefficient of a degenerate acoustic scatterer having four channels at different angles of rotation.
Figure 4B:
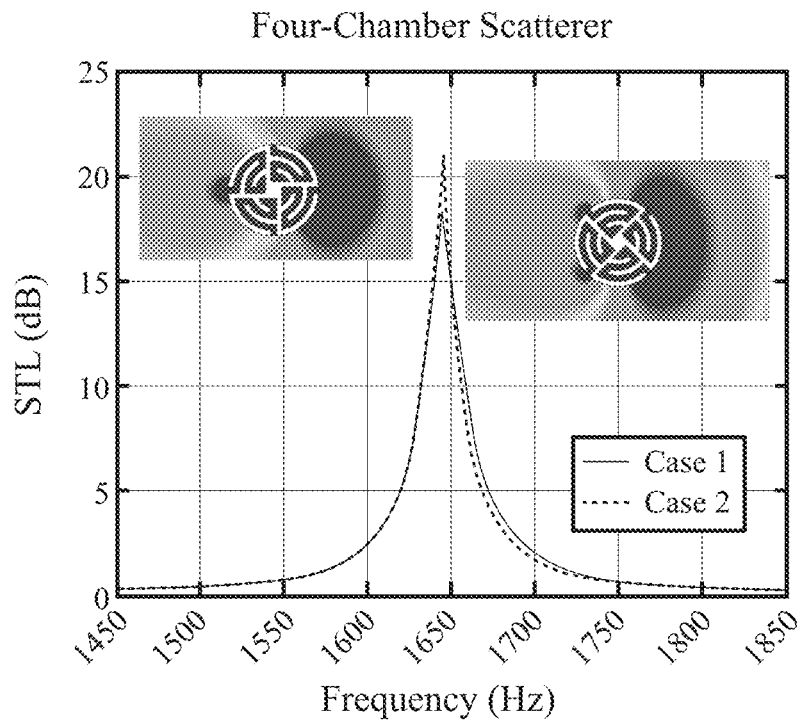

The rotational direction of the degenerate acoustic scatterer 116 with respect to the sound source 112 may not impact the ability of the degenerate acoustic scatterer 116 to absorb sounds at a resonant frequency. For example, referring to FIGS. 4A and 4B, two different cases regarding the rotational position of a four-channel degenerate acoustic scatterer, such as shown in FIG. 2A is shown.

The first case, referred to as "Case 1" illustrates the absorption coefficient of a four-channel degenerate acoustic scatterer when one of the openings of one of the channels of the four-channel acoustic scatterer is substantially facing a sound source. The second case, referred to as "Case 2" illustrates the absorption coefficient of a four-channel degenerate acoustic scatterer when one of the openings of one of the channels of the four-channel acoustic scatterer is substantially rotated around its center. In both cases, the overall absorption coefficient of the four-channel degenerate acoustic scatterer is substantially similar. As such, the rotational direction of the degenerate acoustic scatterers described in this disclosure do not significantly impact the sound-absorbing performance. This may be advantageous, as it allows for easier manufacturing and utilization of the degenerate acoustic scatterer device as there is no requirement that the degenerate acoustic scatterer device be calibrated to be in a specific rotational position.

Figure 5A:
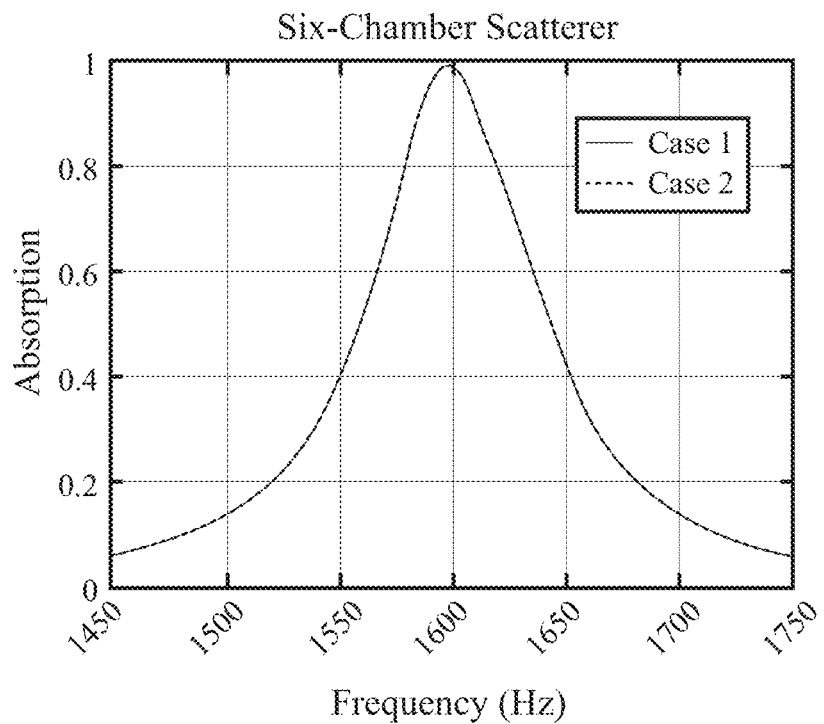
FIGS. 5A and 5B illustrate a sound-absorbing coefficient of a degenerate acoustic scatterer having six channels at different angles of rotation.
Figure 5B:
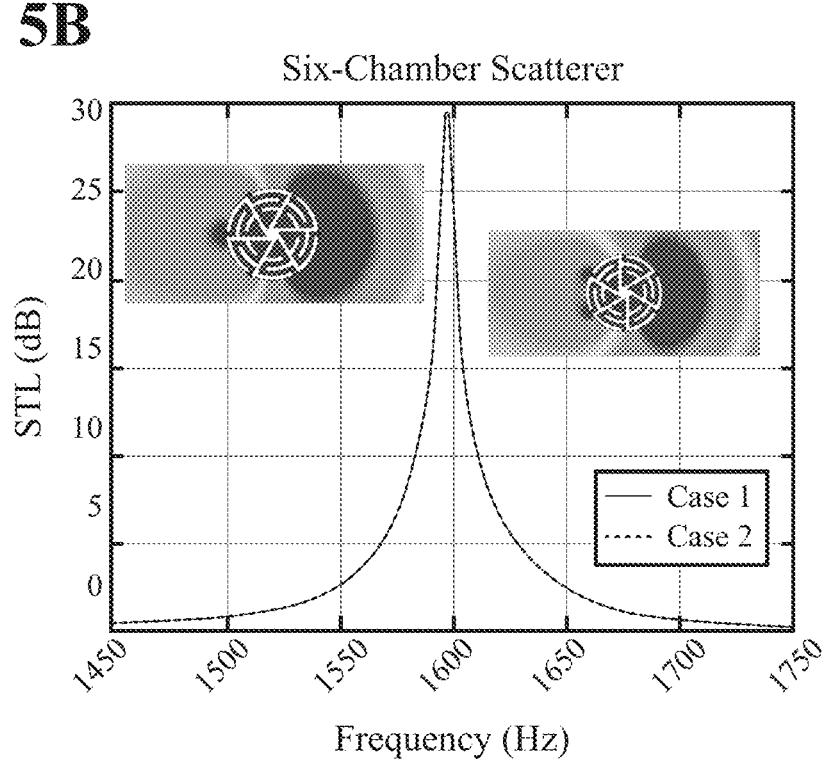

The same is true if the degenerate acoustic scatterer is a six channel (or more) degenerate acoustic scatterer, such as shown in FIG. 2B. For example, referring to FIGS. 5A and 5B, two different cases regarding the rotational position of a six-channel degenerate acoustic scatterer, such as shown in FIG. 2B is shown. Like before, "Case 1" illustrates the absorption coefficient of a six-channel degenerate acoustic scatterer when one of the openings of one of the channels of the six-channel acoustic scatterer is substantially facing a sound source. "Case 2" illustrates the absorption coefficient of a six-channel degenerate acoustic scatterer when one of the openings of one of the channels of the six-channel acoustic scatterer is substantially rotated away from the sound source. In both cases, the overall absorption coefficient of the six-channel degenerate acoustic scatterer is substantially similar. As such, the rotational direction of the degenerate acoustic scatterers described in this disclosure do not significantly impact the sound-absorbing performance.

Figure 6A:
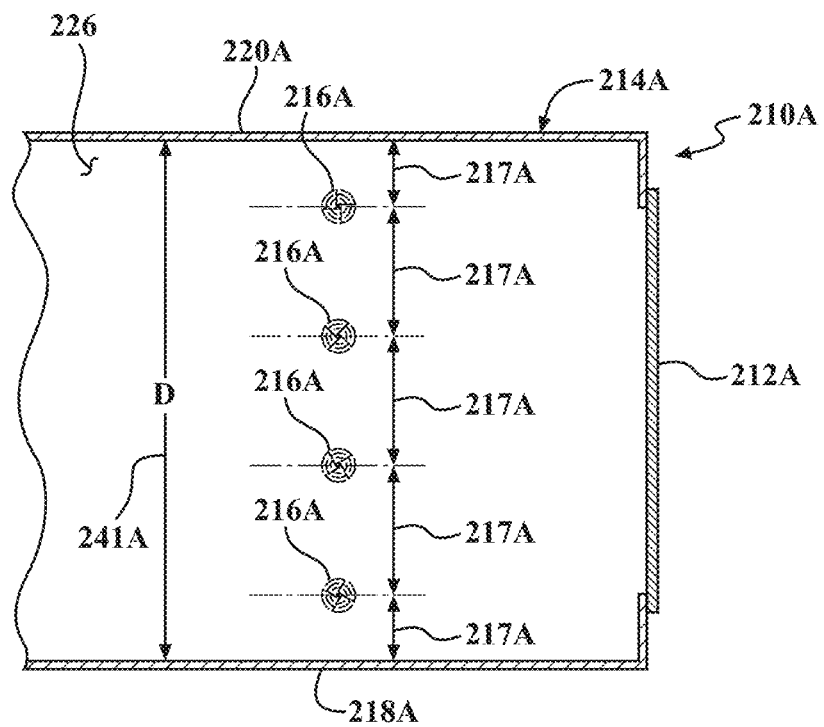
FIGS. 6A and 6B illustrate different implementations of an array of degenerate acoustic scatterers.

Referring to FIG. 6A, an example of a system 210A is shown. Like before, like reference numerals have been utilized to refer to like elements. In this example, there are four degenerate acoustic scatterers 216A that form an array. The array of degenerate acoustic scatterers 216A generally forms a row that is perpendicular to the walls 218A and/or 220A. This type of configuration can be useful in situations wherein the distance D between the walls is fairly wide and requires a plurality of degenerate acoustic scatterers 216A to provide appropriate sound absorption type characteristics to the system 210A.

The distances 217A between each of the degenerate acoustic scatterers 216A and/or the degenerate acoustic scatterers 216A at the end of the row and the wall 218A or 220A are substantially equal. Regarding "substantially equal", this means that the distances 217A may vary by as much as 10%. The total number of acoustic scatterers 216A for the array to optimally absorb sound is generally based on the distance 241A between the first wall 218A and the second wall 220A. The total minimum number (N) of acoustic scatterers required for an application can be expressed as follows:

$$N=D/(c/f),$$

wherein D is a distance between the first wall 218A and the second wall 220A, c is the speed of sound in air, and f is the resonant frequency of the monopole response and the dipole response.

Figure 6B:
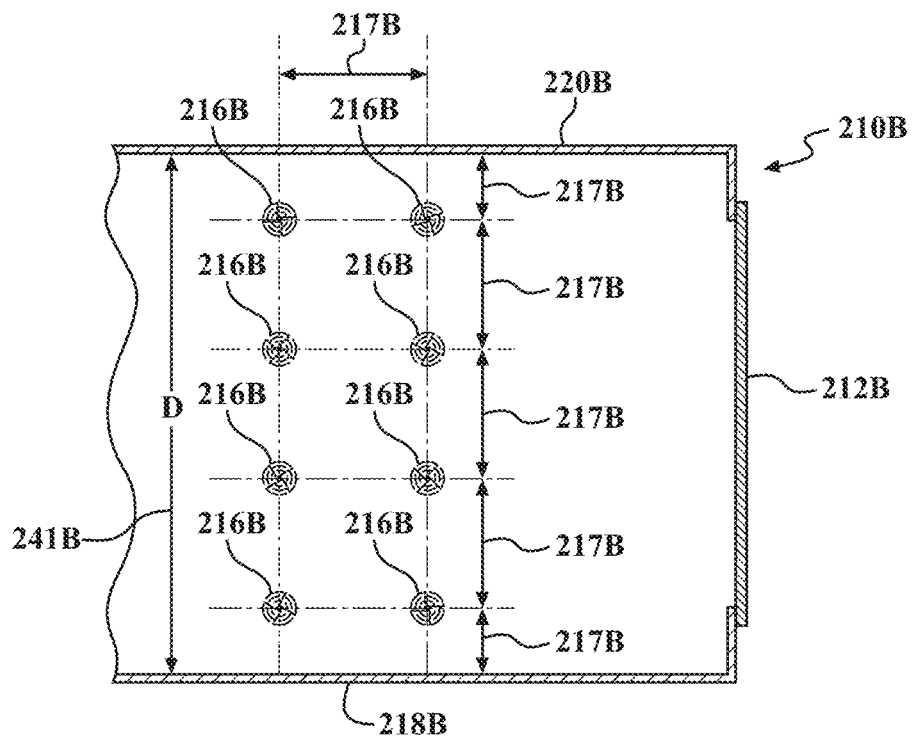

Referring to FIG. 6B, this example of the system 210B is similar to the system illustrated in FIG. 6A. However, the system 210B has two rows of degenerate acoustic scatterers 216B. Like before, the distances 217B between the degenerate acoustic scatterers 216B across the width (between the walls 218B and 220B) of the system 210B is substantially equal. In addition, the distance between the degenerate acoustic scatterers 216B from one row to another is also substantially similar to the distance 217B. The purpose of having two (or more) rows of degenerate acoustic scatterers 216B is to improve the overall sound absorption characteristics of the system 210B. While only one row may be necessary, a second row will provide additional absorption of sound.

Figure 7A:
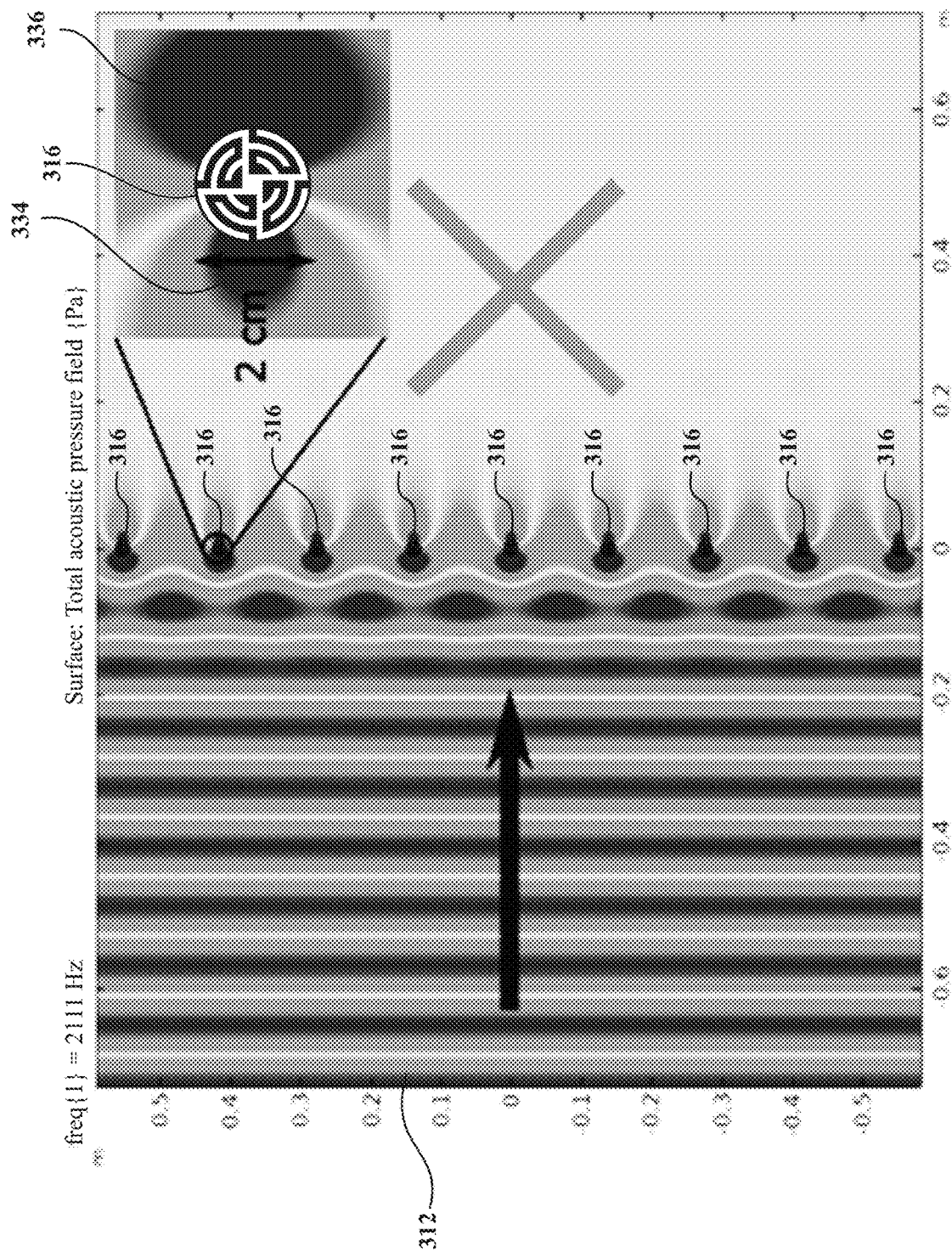
FIGS. 7A-7C illustrate the results of the absorption capabilities of an array of degenerate acoustic scatterers having two channels.

Referring to FIG. 7A, a simulation of a system having nine separate acoustic scatterers 316 forming an array having one row is shown. Here, the acoustic scatterers 316 are rotated so the openings 334 of the acoustic scatterers 316 substantially face the source of sound 312. FIG. 7A illustrates a total sound field having a frequency of 2111 Hz. One can see in this figure that the amplitude of the wave at the left side of the array of the acoustic scatterers 316 is unitary meaning there is no reflection. Also, the amplitude of the wave at the right side of the array of the acoustic scatterers 316 is zero indicating that the transmission is zero—indicating total absorption.

Therefore, all the energy is absorbed by the array of the acoustic scatterers 316. In the magnified view of the single scatterer, one can see that the pressure field near the degenerate acoustic scatterers 316 are of the opposite phase, but the shape is different. This is due to the superposition of the monopole and dipole moments. This design takes advantage of the two components and makes them scatter the same amount of energy to achieve total absorption.

Figure 7B:
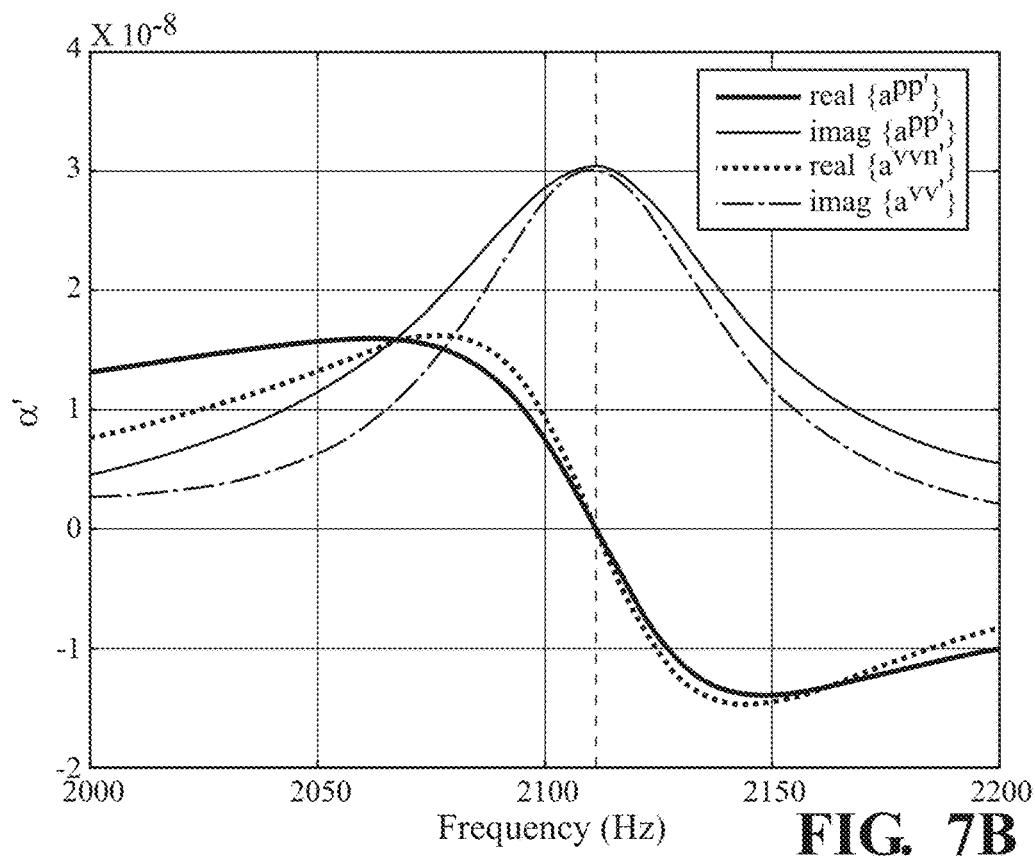
Figure 7C:
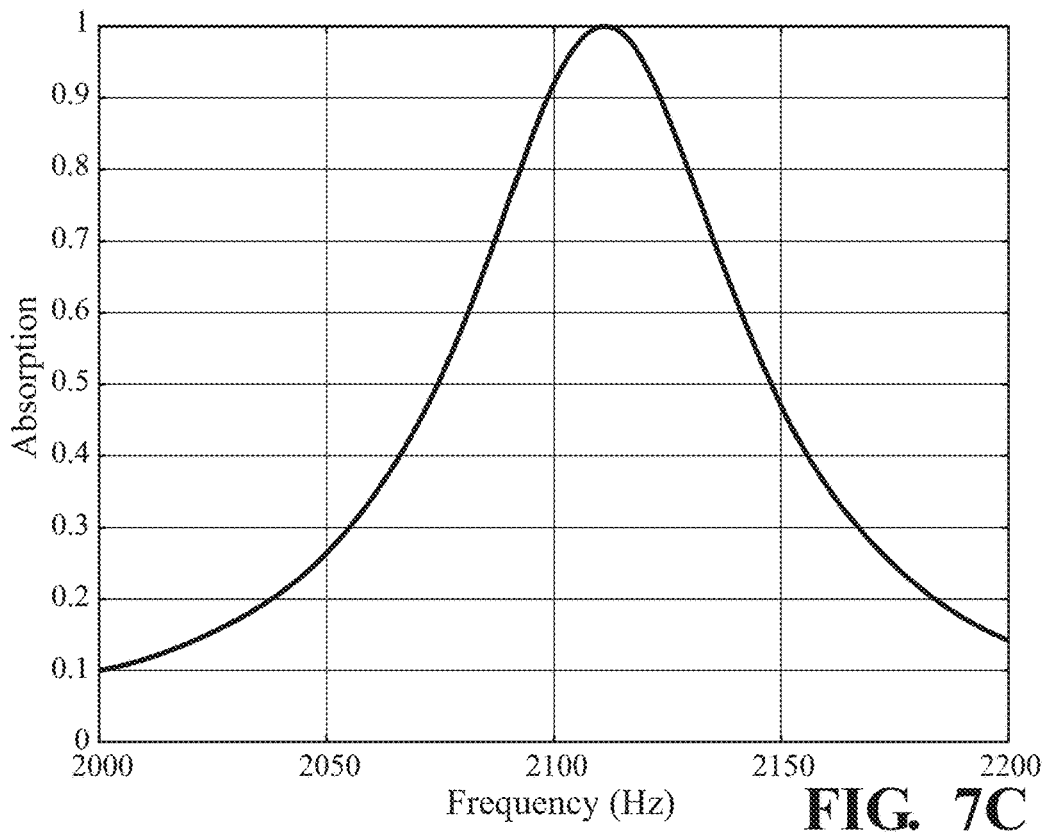

FIG. 7B illustrates monopole and dipole scattering coefficients. The two components have the same strength as required by the design. As shown in FIG. 7C, the absorption coefficient is 1.0 at 2111 Hz.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A sound isolation device comprising:
   at least one degenerate acoustic scatterer having a plurality of channels, the plurality of channels each have an open end and a terminal end, the terminal ends of the plurality of channels being separate from each other; and
   wherein the at least one degenerate acoustic scatterer has an acoustic monopole response and an acoustic dipole response, wherein the acoustic dipole response and the acoustic monopole response of the at least one degenerate acoustic scatterer have a resonant frequency that is substantially similar.

2. The sound isolation device of claim 1, wherein the plurality of channels includes at least three channels.

3. The sound isolation device of claim 1, wherein the plurality of channels includes at least four channels.

4. The sound isolation device of claim 3, wherein an absorption coefficient that the at least one degenerate acoustic scatterer absorbs sound at the resonant frequency is substantially similar when either (a) at least one of the plurality of channels is aligned parallel along a wave propagation direction of the sound or (b) at least one of the plurality of channels is aligned perpendicular along a wave propagation direction of the sound.

5. The sound isolation device of claim 1, wherein the plurality of channels are in a zigzag formation.

6. The sound isolation device of claim 1, wherein a cross section along a width of the at least one degenerate acoustic scatterer defines a symmetrical shape having at least one line of symmetry, the symmetrical shape having an outer perimeter, wherein the open end of the plurality of channels are adjacent to the outer perimeter.

7. The sound isolation device of claim 1, wherein each channel of the plurality of channels have a substantially similar volume.

8. The sound isolation device of claim 1, wherein each channel of the plurality of channels have a substantially similar shape across a width of the at least one degenerate acoustic scatterer.

9. The sound isolation device of claim 1, wherein the at least one degenerate acoustic scatterer includes a plurality of degenerate acoustic scatterers, wherein the plurality of degenerate acoustic scatterers are spaced apart at a substantially equal distance from each other, and wherein the acoustic dipole response and the acoustic monopole response of the plurality of degenerate acoustic scatterers have substantially similar resonant frequencies.

10. The sound isolation device of claim 1, wherein the at least one degenerate acoustic scatterer is mounted within a vehicle.

11. The sound isolation device of claim 10, wherein the at least one degenerate acoustic scatterer forms a structural member of the vehicle.

12. A sound isolation system comprising:
at least one degenerate acoustic scatterer;
the at least one degenerate acoustic scatterer having a plurality of channels, the plurality of channels each have an open end and a terminal end, the terminal ends of the plurality of channels being separate from each other;
wherein the at least one degenerate acoustic scatterer has an acoustic monopole response and an acoustic dipole response, wherein the acoustic dipole response and the acoustic monopole response of the at least one degenerate acoustic scatterer have a resonant frequency that is substantially similar;
and
a first wall and a second wall, wherein the first wall and second wall generally oppose one another and define a space, wherein the at least one degenerate acoustic scatterer is located in the space between the first wall and the second wall.

13. The sound isolation system of claim 12, wherein the plurality of channels includes at least three channels.

14. The sound isolation system of claim 12, wherein the plurality of channels includes at least four channels.

15. The sound isolation system of claim 14, wherein a cross section along a width of the at least one degenerate acoustic scatterer defines a symmetrical shape having at least one line of symmetry, the symmetrical shape having an outer perimeter, wherein the open end of the plurality of channels are adjacent to the outer perimeter.

16. The sound isolation system of claim 12, wherein each channel of the plurality of channels have a substantially similar volume.

17. The sound isolation system of claim 12, wherein each channel of the plurality of channels have a substantially similar shape across a width of the at least one degenerate acoustic scatterer.

18. The sound isolation system of claim 12, wherein a distance of the space between the first wall and the second wall is smaller than a wavelength at the resonant frequency:

$$D < \frac{c}{f},$$

and
wherein D the distance of the space between the first wall and the second wall, c is a speed of sound, and f is the resonant frequency of the acoustic monopole response and the acoustic dipole response of the at least one degenerate acoustic scatterer.

19. The sound isolation system of claim 12, further comprising:
a plurality degenerate acoustic scatterers forming an array of degenerate acoustic scatters, the array of degenerate acoustic scatters located between the first wall and the second wall, wherein the array of degenerate acoustic scatters includes a number (N) of acoustic scatterers,
wherein a number (N) of the plurality degenerate acoustic scatterers is:

$N=D/(c/f)$, and wherein D is a distance between the first wall and the second wall, c is the speed of sound in air, and f is the resonant frequency of the acoustic monopole response and the acoustic dipole response.

20. The sound isolation system of claim 19, wherein the array of degenerate acoustic scatters are arranged along a row substantially perpendicular to one of the first wall and the second wall.

* * * * *